United States Patent
Mao et al.

(10) Patent No.: US 10,666,149 B2
(45) Date of Patent: May 26, 2020

(54) CONTROL CIRCUIT FOR SWITCHING POWER SUPPLY

(71) Applicant: TRIDONIC GMBH & CO KG, Dornbirn (AT)

(72) Inventors: Egbert Mao, Guangdong (CN); Scotty Zhong, Guangdong (CN); Gary Chen, Guangdong (CN); Steven Chen, Guangdong (CN); David Wang, Guangdong (CN); Daniel Wang, Guangdong (CN)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/463,436

(22) PCT Filed: Nov. 14, 2017

(86) PCT No.: PCT/CN2017/110781
§ 371 (c)(1),
(2) Date: May 23, 2019

(87) PCT Pub. No.: WO2018/099264
PCT Pub. Date: Jun. 7, 2018

(65) Prior Publication Data
US 2019/0326818 A1    Oct. 24, 2019

(30) Foreign Application Priority Data

Nov. 30, 2016    (CN) ............. 2016 1 1088782

(51) Int. Cl.
*H02M 3/335*    (2006.01)
*H02M 3/44*    (2006.01)
(Continued)

(52) U.S. Cl.
CPC ............. *H02M 3/335* (2013.01); *H02M 3/44* (2013.01); *H02M 7/219* (2013.01); *H02M 2001/0048* (2013.01)

(58) Field of Classification Search
CPC ............. H02M 3/335; H02M 3/33507; H02M 3/33523; H02M 3/44; H02M 7/219; H02M 2001/0048
(Continued)

(56) References Cited

U.S. PATENT DOCUMENTS 8,339,813 B2    12/2012  Wang et al.
8,369,108 B2    2/2013   Guan et al.
(Continued)

FOREIGN PATENT DOCUMENTS

CN    102044983    5/2011
CN    102281002    12/2011
(Continued)

OTHER PUBLICATIONS

International Search Report dated Feb. 8, 2018 in parent PCT application PCT/CN2017/110781.
(Continued)

*Primary Examiner* — Yemane Mehari
(74) *Attorney, Agent, or Firm* — Andrus Intellectual Property Law

(57) ABSTRACT

The present application provides a control circuit of a switching power supply, the control circuit comprising: a central control circuit which has a first control port, a second control port, and a third control port; and a current selection circuit which is disposed between the third control port and a ground and has two or more selection terminals, a connection state between the selection terminals being switched between different connection states to adjust the output current value of the switching power supply, wherein the
(Continued)

different connection states include disconnection, shorting, and connection with a resistor having a predetermined resistance value. According to the present application, the output current value of the switching power supply is adjusted by switching the connection state between the selection terminals between the states of disconnection, shorting, and connection with a resistor having a predetermined resistance value.

8 Claims, 2 Drawing Sheets

(51) Int. Cl.
*H02M 7/219* (2006.01)
*H02M 1/00* (2006.01)

(58) Field of Classification Search
USPC ............ 323/282–285; 363/16, 21.02, 21.12
See application file for complete search history.

(56) References Cited

U.S. PATENT DOCUMENTS

| | | | | |
|---|---|---|---|---|
| 8,416,582 | B2* | 4/2013 | Usui | H02M 3/3376 |
| | | | | 363/131 |
| 8,542,500 | B2 | 9/2013 | Guan et al. | |
| 8,897,036 | B2* | 11/2014 | Chen | H02M 3/3387 |
| | | | | 363/21.02 |
| 9,455,640 | B2* | 9/2016 | Ohtake | H02M 3/33546 |
| 9,924,571 | B2* | 3/2018 | Duenser | H02M 3/33523 |
| 10,064,249 | B2* | 8/2018 | Marte | H05B 33/0815 |
| 2009/0284991 | A1* | 11/2009 | Nishikawa | H02M 3/3376 |
| | | | | 363/21.02 |
| 2011/0007529 | A1* | 1/2011 | Usui | H02M 3/33569 |
| | | | | 363/21.12 |
| 2013/0335045 | A1 | 12/2013 | Zhang et al. | |
| 2014/0368177 | A1 | 12/2014 | Tseng et al. | |
| 2015/0312986 | A1* | 10/2015 | Bell | H05B 33/0815 |
| | | | | 315/193 |
| 2016/0302268 | A1* | 10/2016 | Dunser | H05B 33/0815 |
| 2019/0326818 | A1* | 10/2019 | Mao | H02M 7/219 |

FOREIGN PATENT DOCUMENTS

| | | |
|---|---|---|
| CN | 202713762 | 1/2013 |
| JP | 2011204554 | 10/2011 |

OTHER PUBLICATIONS

European search report dated Oct. 23, 2019 in co-pending European patent application 17876538.4.

* cited by examiner

CONTROL CIRCUIT FOR SWITCHING POWER SUPPLY

CROSS REFERENCE TO RELATED APPLICATION

The present application is the U.S. national stage application of international application PCT/CN2017/110781 filed Nov. 14, 2017, which international application was published on Jun. 7, 2018 as International Publication WO 2018/099264 A1. The international application claims priority to China Patent Application 201611088782.4 filed Nov. 30, 2016.

TECHNICAL FIELD

The present invention relates to the technical field of power supply, and in particular, to a control circuit of a switching power supply.

BACKGROUND ART

Switching power supply is a power supply that uses an electronic circuit to control the time ratio of on and off of a switching element and to maintain a stable output voltage.

The switching power supply can have a rectifying circuit, a smoothing circuit, a switching element, a transformer, an output side rectifying circuit, and a central control device, etc. The rectifying circuit and the smoothing circuit can rectify and smooth an input alternating current; the central control device may have an on/off control port which can output a control signal to control on and off of the switching element, so that the smoothed electrical signal resonates; the transformer causes the resonant electrical signal to be transmitted to the output side of the switching power supply; the output side rectifying circuit rectifies the electrical signal transmitted to the output side of the switching power supply to form an output electrical signal for output.

Generally, the central control device may further have a resonant frequency control port and an impedance between the resonant frequency control port and a ground of the switching power supply can control the resonant frequency of the switching power supply during work and the resonant frequency can affect the output current value of the switching power supply. The central control device may be a semiconductor integrated circuit such as an Infineon ICL5101 chip.

FIG. 1 is a schematic view of a central control device of a prior art. As shown in FIG. 1, on/off control ports 2 and 3 of a central control device 1 can be connected to switching elements 4 and 5 respectively. Moreover, resistors R50 and R35 are connected between a resonant frequency control port 9 of the central control device 1 and the ground GND, wherein the resistors R50 and R35 are used to control the resonant frequency of the switching power supply during work.

It should be noted that the above introduction to technical background is merely for the purpose of a clear and complete description of the technical solutions of the present application and for a better understanding by those of ordinary skill in the art. The above technical solutions should not be considered to be well-known to those of ordinary skill in the art simply because these solutions are set forth in the section of background art of the present application.

SUMMARY OF INVENTION

When a switching power supply is used, sometimes it is necessary to provide a plurality of output current values from one switching power supply and switch between the pluralities of output current values.

Embodiments of the present application provide a control circuit of a switching power supply to adjust the output current value of the switching power supply by switching the connection state between selection terminals between the states of disconnection, shorting, and connection with a resistor having a predetermined resistance value.

According to the embodiments of the present application, a control circuit of a switching power supply having a high-voltage side switching element and a low-voltage side switching element connected in series between a positive potential end and a ground of a direct current power supply is provided, the control circuit comprising:

a central control circuit which has a first control port, a second control port, and a third control port, wherein the first control port and the second control port respectively output a control signal of turning on and off the high-voltage side switching element and the low-voltage side switching element, and an equivalent impedance between the third control port and the ground is used to set an output current value of the switching power supply; and a current selection circuit which is disposed between the third control port and the ground and has two or more selection terminals, a connection state between the selection terminals being switched between different connection states to adjust the output current value of the switching power supply, wherein the different connection states include disconnection, shorting, and connection with a resistor having a predetermined resistance value.

An advantageous effect of the embodiments of the present application is: the output current value of the switching power supply is adjusted by switching the connection state between selection terminals between the states such as disconnection, shorting, and connection with a resistor having a predetermined resistance value.

In the following description and the attached drawings, specific embodiments of the present invention are disclosed in detail and manners in which the principle of the present invention may be employed are shown clearly. It should be understood that the embodiments of the present invention are not thus limited in scope. The embodiments of the present invention include a plurality of variations, modifications, and equivalents within the gist and scope of the appended claims.

Features described and/or illustrated with respect to one embodiment may be used in one or more other embodiments in the same or similar manner, in combination with, or in place of, features in other embodiments.

It should be emphasized that the term "comprise/include" used herein refers to the existence of a feature, a whole piece, a step or a component, but does not exclude the existence or addition of one or more other features, whole pieces, steps or components.

BRIEF DESCRIPTION OF THE DRAWINGS

The attached drawings included herein constitute a part of the specification and are used to provide a further understanding to the embodiments of the present invention and to illustrate the embodiments of the present invention, and illustrate, in combination with the written description, the principles of the present invention. Obviously, the attached drawings in the following description are merely some of the embodiments of the present invention, and those of ordinary skill in the art can obtain other drawings according to these attached drawings without involving any creative work. In the attached drawings.

SPECIFIC EMBODIMENTS

The aforementioned and other features of the present invention will be apparent through the following description with reference to the attached drawings. The specification and the attached drawings disclose specific embodiments of the present invention, which illustrate part of the embodiments in which the principles of the present invention may be employed. It should be understood that the present invention is not limited to the described embodiments. On the contrary, the present invention includes all modifications, variations and equivalents falling in the scope of the appended claims.

Embodiment 1

Figure 1:
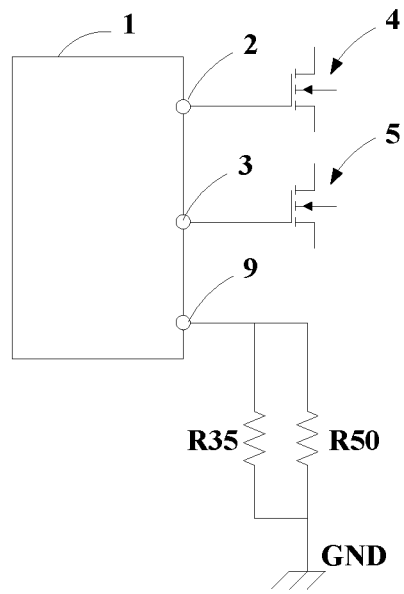
FIG. 1 is a schematic view of a conventional central control circuit.
Figure 2:
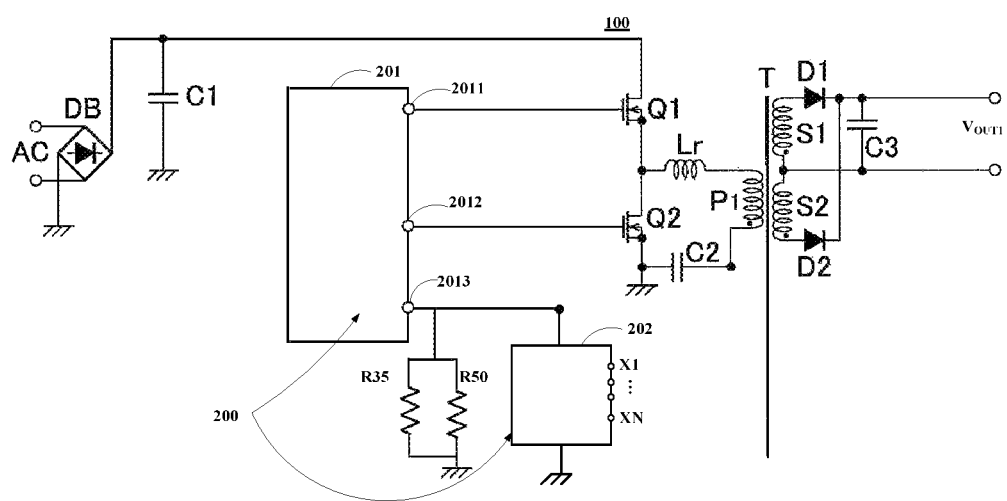
FIG. 2 is a schematic view of a control circuit of Embodiment 1 of the present application.

Embodiment 1 of the present application provides a control circuit of a switching power supply, and FIG. 2 is a schematic view of the control circuit.

As shown in FIG. 2, a control circuit 200 is used to control a switching power supply 100. In the present embodiment, the load of the switching power supply 100 may be an electronic apparatus that requires a direct current power supply, such as a light emitting diode (LED).

The structure of the switching power supply 100 will first be described below.

As shown in FIG. 2, the switching power supply 100 can have a rectifying circuit DB and a smoothing capacitor C1. The rectifying circuit DB may be, for example, a diode bridge circuit that can rectify an alternating voltage input by an alternating current power supply AC. The smoothing capacitor C1 can smooth the voltage rectified by the rectifying circuit DB to form a direct current power supply.

The switching power supply 100 may further have a high-voltage side switching element Q1 and a low-voltage side switching element Q2, and the high-voltage side switching element Q1 and the low-voltage side switching element Q2 are connected in series between a positive potential end and a ground of the direct current power supply. The high-voltage side switching element Q1 and the low-voltage side switching element Q2 may be, for example, a metal oxide semiconductor field effect transistor (MOSFET).

The switching power supply 100 may further have a transformer T and a resonant capacitor C2, and the transformer T has a primary winding P1 and secondary windings S1 and S2. A series circuit consisting of the primary winding P1 and the resonant capacitor C2 is connected in parallel with the low-voltage side switching element Q2, and the leakage inductance between the primary winding P1 and the secondary windings S1 and S2 may be expressed as a reactor Lr.

The switching power supply 100 may further have rectifying diodes D1 and D2 and a smoothing capacitor C3, wherein the rectifying diodes D1 and D2 are respectively connected to the secondary windings S1 and S2 for rectifying sensing voltages on the secondary windings S1 and S2, and the smoothing capacitor C3 is used to smooth the rectified voltage to form an output voltage $V_{OUT1}$.

As shown in FIG. 2, the control circuit 200 can alternately turn on and off Q1 and Q2 to keep the output voltage $V_{OUT1}$ constant. Here, Q1 and Q2 can be complementarily turned on and off.

Next, the control circuit 200 will be described.

As shown in FIG. 2, the control circuit 200 includes: a central control circuit 201 and a current selection circuit 202.

In the present embodiment, the central control circuit 201 may have a first control port 2011, a second control port 2012, and a third control port 2013, wherein the first control port 2011 and the second control port 2012 respectively output a control signal of turning on and off the high-voltage side switching element Q1 and the low-voltage side switching element Q2; an equivalent impedance between the third control port 2013 and the ground is used to set a resonant frequency of the switching power supply 100 during work, and the resonant frequency further controls the output current value of the switching power supply 100.

In the present embodiment, the current selection circuit 202 may be disposed between the third control port 2013 and the ground. The current selection circuit 202 can have two or more selection terminals X1, ..., XN, and these selection terminals can be switched between different connection states to adjust the resonant frequency of the switching power supply 100 during work and control the output current value of the switching power supply 100. The different connection states may include states such as disconnection, shorting, and connection with a resistor having a predetermined resistance value.

According to the present embodiment, the output current value of the switching power supply 100 can be adjusted by switching the connection state between the selection terminals between the states such as disconnection, shorting, and connection with a resistor having a predetermined resistance value, thereby achieving switching of the circuit output current value with a simple circuit at a low cost.

In the present embodiment, the central control circuit 201 may have other control ports in addition to the first control port 2011, the second control port 2012, and the third control port 2013. The central control circuit 201 may be a semiconductor integrated circuit chip such as an Infineon ICL5101 chip, and the third control port 2013 may be an RFM port of the Infineon ICL5101 chip. In addition, the present embodiment is not limited thereto, and the central control circuit 201 may also be other chips. As to specific structure and working principle of the central control circuit 201, reference may be made to the prior art and they will not be described in the present embodiment.

In the present embodiment, the current selection circuit 202 may further have at least one current selection subunit (not shown in FIG. 2), and each current selection subunit may be connected to a corresponding selection terminal X1, ..., XN, etc.

In the present embodiment, the at least one current selection subunit may include at least two current selection branches connected in parallel, and each current selection branch includes a resistor and a switching element connected in series between the third control port 2013 and the ground. Trigger voltages required to turn on the switching element of each branch of the at least two current selection branches are made different from each other, and thus the switching elements of the respective branches can be turned on respectively and different resistors can be selected, thereby changing the resistance value between the third control port 2013 and the ground.

For example, when the connection state between the selection terminals X1, . . . , XN is switched to a connection with a resistor having a predetermined resistance value, the switching element requiring a higher trigger voltage may be in an off state and the switching element requiring a lower trigger voltage may be in an on state. As a result, the resistor connected in series with the switching element in an on state is selected.

In the present embodiment, each switching element may have a control end to control the on or off of that switching element, and the control end may be connected to the corresponding selection terminal through a resistor and/or a diode. For example, the diode may be a Zener diode. The switching element where the control end is connected to a Zener diode needs a higher trigger voltage to be turned on because the control voltage first needs to reach the reverse breakdown voltage of the Zener diode to break down the Zener diode before it can act on the control end of the switching element to turn on the switching element.

In the present embodiment, the control end of the switching element requiring a lower trigger voltage may be connected to the ground through a first electro-static discharge (ESD) unit to electrostatically protect the control end.

In the present embodiment, at least one selection terminal of the two or more selection terminals may be electrically connected to a control power supply (not shown in FIG. 2) which is used for providing a voltage to turn on the switching element.

In the present embodiment, at least one selection terminal of the two or more selection terminals may be electrically connected to the ground to realize corresponding control logic.

In the present embodiment, at least one selection terminal of the two or more selection terminals may be electrically connected to a second electro-static discharge (ESD) unit to protect the selection terminal electrostatically.

In addition, in the present embodiment, the switching element may be a metal oxide semiconductor field effect (MOS-FET) transistor.

In the present embodiment, as shown in FIG. 2, resistors R50 and R35 may be connected between the third control port 2013 of the central control circuit 201 and the ground GND, and thus the resistors R50 and R35 can be connected in parallel with the resistor selected by the current selection circuit 202 to set the output current value of the switching power supply 100 jointly.

Figure 3:
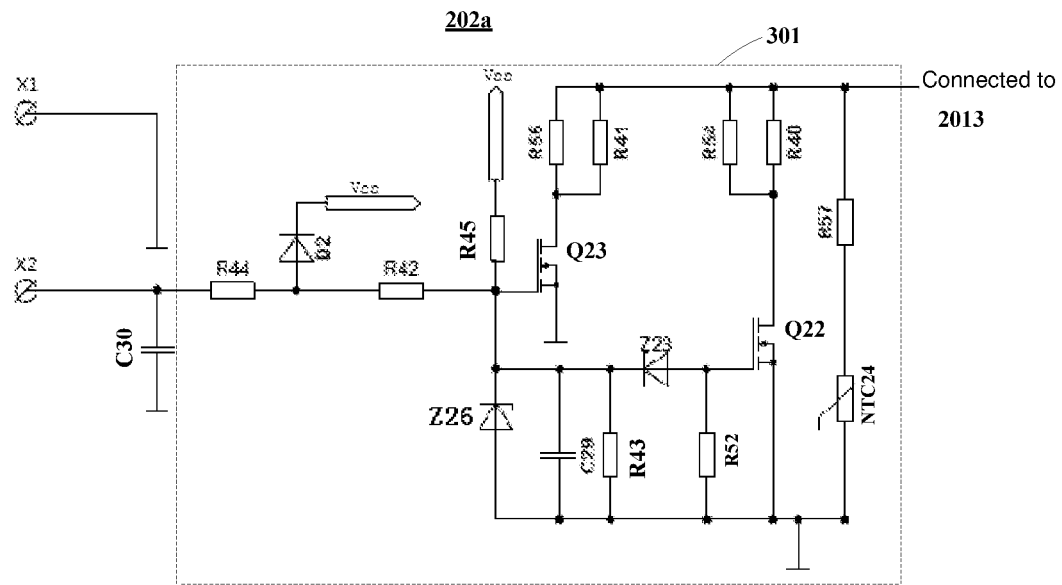
FIG. 3 is a schematic view of a current selection circuit of Embodiment 1 of the present application.

FIG. 3 is a schematic view of the current selection circuit of Embodiment 1. Current selection circuit 202a in FIG. 3 is a specific implementation of the current selection circuit 202 in FIG. 2.

As shown in FIG. 3, the current selection circuit 202a has two selection terminals, X1 and X2. The selection terminal X1 is connected to the ground and the selection terminal X2 is connected to a current selection subunit 301.

In the present embodiment, the current selection subunit 301 includes two current selection branches connected in parallel, wherein one current selection branch is formed by connecting a switching element Q23 with parallel-connected resistors R55\R41 in series, and the other current selection branch is formed by connecting a switching element Q22 with parallel-connected resistors R54 \R40 in series. Q22 and Q23 are both metal oxide semiconductor field effect (MOSFET) transistors. In addition, Q22 and Q23 may also be other types of switching elements.

In the present embodiment, the gate of the switching element Q23 may be connected to a control voltage Vcc through a resistor R45, and the gate of the switching element Q22 may be connected to the gate of the control switching element Q23 through a Zener diode Z23. Due to the presence of the Zener diode Z23, the trigger voltage required to turn on the switching element Q22 is higher than the trigger voltage required to turn on the switching element Q23.

In the present embodiment, the gate of the switching element Q23 may also be connected to the ground through a resistor R43.

In the present embodiment, the gate of the switching element Q23 may also be connected to the selection terminal X2 through resistors R42 and R44.

In the present embodiment, the correspondence between the connection state between the selection terminals X1 and X2 and the resistance selected by the current selection circuit 202a may be as follows:

When the selection terminals X1 and X2 are disconnected, the voltage of Q23 turns on Q23, and the Zener diode Z23 is broken down, so that Q22 is also turned on. As a result, the current selection circuit 202a connects the selected parallel-connected resistors R55, R41, R54, and R40 between the third control port 2013 and the ground, and thus the output current value is set by the parallel resistance values of the resistors R55, R41, R54, and R40 and the resistors R50 and R35.

When the selection terminals X1 and X2 are shorted, the voltage difference between the two ends of the resistor R43 is lowered, and thus the voltage of the gate of Q23 is insufficient to turn on Q23, that is, Q23 is off, and Q22 is also turned off. As a result, the current selection circuit 202a does not connect resistors between the third control port 2013 and the ground, and thus the output current value is set by the parallel resistance value of the resistors R50 and R35.

When a resistor having a predetermined resistance value is connected between the selection terminals X1 and X2, the voltage difference between the two ends of the resistor R43 is higher than the case where the terminals X1 and X2 are shorted. By setting the predetermined resistance value and the breakdown voltage of the Zener diode Z22, the voltage of the gate of Q23 can be made sufficient to turn on Q23 but not capable of breaking down the Zener diode Z23, that is, to turn on Q23 while turning off Q22. As a result, the current selection circuit 202a connects the selected parallel-connected resistors R55 and R41 between the third control port 2013 and the ground, and thus the output current value is set by the parallel resistance values of the resistors R55 and R41 and the resistors R50 and R35.

According to the current selection circuit 202a of FIG. 3, the switching of the output current can be realized with a simple circuit at a low cost. Moreover, the current selection circuit 202a has good control logic, that is, a small output current value can be obtained when the selection terminals X1 and X2 are disconnected. As a result, the output power consumption can be reduced when an erroneous connection or a loose connection occurs between the selection terminals X1 and X2.

In the present embodiment, the number of the selection terminals may be more than two, and the number of the current selection subunit 301 may be increased as the number of the selection terminals increases. As a result, there can be more connection modes between the terminals, thereby increasing the number of resistance values that can be selected by the current selection circuit 202a and further expanding the adjustment range of the output current value.

In the present embodiment, the current selection subunit 301 may further have a first electro-static discharge unit D2. The selection terminal X2 may be connected to the control power supply Vcc through the resistor R44 and the first electro-static discharge unit D2, wherein the first electro-static discharge unit D2 may be a diode. As a result, the electro-static discharge voltage of the first electro-static discharge unit D2 may be clamped to a voltage of the control power supply Vcc to electrostatically protect the selection terminal X2.

In the present embodiment, the current selection subunit 301 may further have a second electro-static discharging unit Z26, and the second electro-static discharging unit Z26 may be disposed between the gate of the Q23 and the ground for providing electrostatic protection to the gate of Q23.

In addition, as shown in FIG. 3, in the present embodiment, the current selection circuit 202a may further have a resistor NTC24 for temperature compensation, and elements such as resistors R57, R52, and capacitors C29 and C30. For description of these elements, reference may be made to the prior art and it will not be described in the present embodiment.

Embodiment 2

Figure 4:
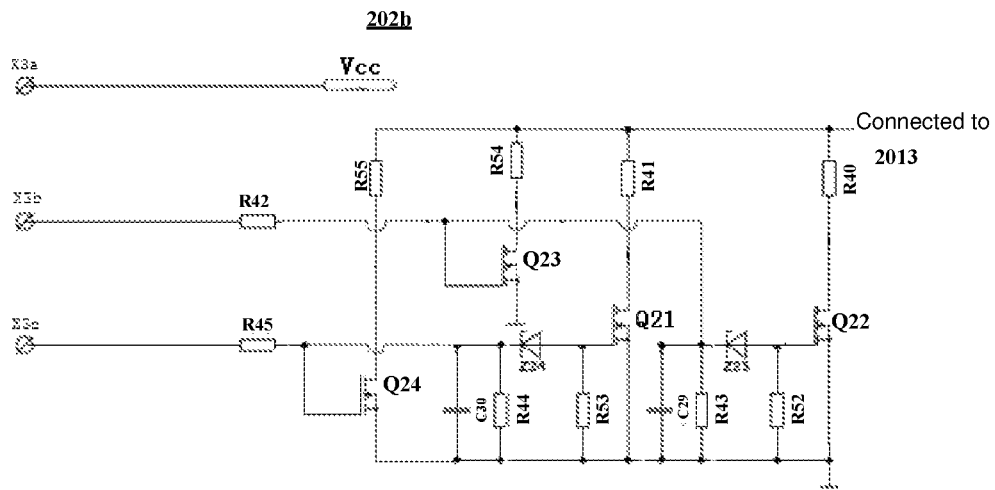
FIG. 4 is a schematic view of a current selection circuit of Embodiment 1 of the present application.

Embodiment 2 of the present application provides a current selection circuit, and FIG. 4 is a schematic view of the current selection circuit of Embodiment 2. The current selection circuit 202b in FIG. 4 is a specific implementation of the current selection circuit 202 in FIG. 2.

As shown in FIG. 4, the current selection circuit 202b may have three selection terminals, X3a, X3b, and X3c. The selection terminal X3a is connected to the control power supply Vcc, the selection terminal X3b is connected to a first current selection subunit, and the selection terminal X3c is connected to a second current selection subunit.

In the present embodiment, the first current selection subunit may include two current selection branches connected in parallel, wherein one current selection branch is formed by connecting the switching element Q23 with the resistor R54 in series, and the other current selection branch is formed by connecting the switching element Q22 with the resistor R40 in series. Q22 and Q23 are both MOS transistors. In addition, Q22 and Q23 may also be other types of switching elements.

In the present embodiment, the gate of the switching element Q23 may be connected to the selection terminal X3b through the resistor R42, and the gate of the switching element Q22 may be connected to the gate of the control switching element Q23 through the Zener diode Z23. Due to the presence of the Zener diode Z23, the trigger voltage required to turn on the switching element Q22 is higher than the trigger voltage required to turn on the switching element Q23.

In the present embodiment, the gate of the switching element Q23 may also be connected to the ground through the resistor R43.

In the present embodiment, the second current selection subunit may include two current selection branches connected in parallel, wherein one current selection branch is formed by connecting a switching element Q24 with the resistor R55 in series, and the other current selection branch is formed by connecting the switching element Q21 with the resistor R41 in series. Q24 and Q21 are both MOS transistors. In addition, Q24 and Q21 may also be other types of switching elements.

In the present embodiment, the gate of the switching element Q24 may be connected to the selection terminal X3c through the resistor R45, and the gate of the switching element Q24 may be connected to the gate of the control switching element Q21 through a Zener diode Z24. Due to the presence of the Zener diode Z24, the trigger voltage required to turn on the switching element Q21 is higher than the trigger voltage required to turn on the switching element Q24.

In the present embodiment, the gate of the switching element Q24 may also be connected to the ground through the resistor R44.

In the present embodiment, the correspondence between the connection state between the selection terminals X3a and X3b and the resistance selected by the current selection circuit 202b may be as follows:

When the selection terminals X3a and X3b are shorted, the voltage difference between the two ends of the resistor R43 is high, the voltage of the gate of Q23 turns on Q23, and the Zener diode Z23 is broken down, which causes Q22 to be turned on. As a result, the current selection circuit 202b connects the selected resistors R54 and R40 between the third control port 2013 and the ground, and thus the output current value is set by the parallel resistance values of the resistors R54 and R40, and the resistors R50 and R35.

When a resistor having a predetermined resistance value is connected between the selection terminals X3a and X3b, by setting the predetermined resistance value and the breakdown voltage of the Zener diode Z23, the voltage of the gate of Q23 can be made sufficient to turn on Q23 but not capable of breaking down the Zener diode Z23, that is, to turn on Q23 while turning off Q22. As a result, the current selection circuit 202b connects the selected resistor R54 between the third control port 2013 and the ground, and thus the output current value is set by the parallel resistance values of the resistor R54 and the resistors R50 and R35.

Further, for the correspondence between the connection state between the selection terminals X3a and X3c and the resistance selected by the current selection circuit 202b, reference may be made to the above description of the connection state between X3a and X3b.

In addition, when the selection terminals X3a and X3b are disconnected, and the selection terminals X3a and X3c are also disconnected, the current selection circuit 202b does not select any resistor, and thus the output current value is set by the parallel resistance value of the resistors R50 and R35.

According to the current selection circuit 202b of FIG. 4, the switching of the output current can be realized with a simple circuit at a low cost. Moreover, the current selection circuit 202b requires less accuracy of the predetermined resistance value.

In the present embodiment, similar to Embodiment 1, the current selection circuit 202b may be provided with a first electro-static discharge unit and/or a second electro-static discharge unit, and details are omitted herein.

In the present embodiment, the number of the selection terminals may be increased, and the number of the current selection subunit may be increased as the number of the selection terminals increases. As a result, there can be more connection modes between the terminals, thereby increasing the number of resistance values that can be selected by the current selection circuit and further expanding the adjustment range of the output current value.

In addition, as shown in FIG. 4, in the present embodiment, the current selection circuit 202b may further have elements such as capacitors C29, C30, and resistors R52 and R53. For description of these elements, reference may be made to the prior art and it will not be described in the present embodiment.

The present application has been described above with reference to specific embodiments. However, those of ordinary skill in the art should understand that the description is illustrative and is not intended to limit the protection scope of the present application. Various kinds of variations and modifications may be made to the present application by those of ordinary skill in the art based on the gist and principles of the present application, and these variations and modifications are also within the scope of the present application.

The invention claimed is:

1. A control circuit of a switching power supply having a high-voltage side switching element and a low-voltage side switching element connected in series between a positive potential end and a ground of a direct current power supply, the control circuit comprising:
   a central control circuit which has a first control port, a second control port, and a third control port, wherein the first control port and the second control port respectively output a control signal of turning on and off the high-voltage side switching element and the low-voltage side switching element, and an equivalent impedance between the third control port and the ground is used to set an output current value of the switching power supply; and
   a current selection circuit which is disposed between the third control port and the ground and has two or more selection terminals, a connection state between the selection terminals being switched between different connection states to adjust the output current value of the switching power supply,
   wherein the different connection states include disconnection, shorting, and connection with a resistor having a predetermined resistance value; and further wherein the current selection circuit also includes:
   at least one current selection subunit, and each current selection subunit is connected to the corresponding selection terminal,
   each current selection subunit includes at least two current selection branches connected in parallel, and
   each current selection branch includes a resistor and a switching element connected in series between the third control port and the ground, wherein trigger voltages required to turn on the switching element of each branch of the at least two current selection branches are made different from each other.

2. The control circuit according to claim 1, wherein when the connection state between the selection terminals is switched to the connection with a resistor having a predetermined resistance value, the switching element requiring a higher trigger voltage is in an off state.

3. The control circuit according to claim 1, wherein each switching element has a control end to control the on or off of the switching element, and the control end is connected to the corresponding selection terminal through a resistor and/or a diode.

4. The control circuit according to claim 3, wherein the diode is a Zener diode.

5. The control circuit according to claim 3, wherein the control end of the switching element requiring a lower trigger voltage is connected to the ground through a first electro-static discharge unit.

6. The control circuit according to claim 1, wherein at least one of the two or more selection terminals is electrically connected to a control power supply which is used for providing a voltage to turn on the switching element.

7. The control circuit according to claim 6, wherein at least one of the two or more selection terminals is electrically connected to the ground.

8. The control circuit according to claim 7, wherein at least one of the two or more selection terminals is electrically connected to a second electro-static discharge unit.

* * * * *